United States Patent [19]

Grasseschi

[11] Patent Number: 4,892,116
[45] Date of Patent: * Jan. 9, 1990

[54] PLUMBING SEALING SYSTEM

[76] Inventor: John J. Grasseschi, 1299 Grafton St., Worcester, Mass. 01609

[ * ] Notice: The portion of the term of this patent subsequent to Nov. 17, 2004 has been disclaimed.

[21] Appl. No.: 186,450

[22] Filed: Apr. 26, 1988

Related U.S. Application Data

[63] Continuation of Ser. No. 91,506, Aug. 31, 1987, Pat. No. 4,756,332, which is a continuation of Ser. No. 943,312, Dec. 17, 1986, Pat. No. 4,706,702.

[51] Int. Cl.$^4$ ............................................. F16L 5/00
[52] U.S. Cl. ................................. 137/360; 137/801; 137/359; 4/192; 277/34; 277/226
[58] Field of Search ............... 277/226, 34, 34.3, 34.6; 137/359, 360, 801; 4/192

[56] References Cited

U.S. PATENT DOCUMENTS

| 612,076 | 10/1898 | Weston | 326/2 |
|---|---|---|---|
| 1,758,708 | 5/1930 | Leddon | 137/354 |
| 2,086,109 | 7/1937 | Albert | 4/141 |
| 2,447,340 | 8/1948 | Jackson | 277/226 |
| 3,032,062 | 5/1962 | Blahnik | 137/593 |
| 3,136,570 | 6/1964 | Lee | 137/360 |
| 3,387,816 | 6/1968 | Holycross | 251/175 |
| 3,590,876 | 7/1971 | Young | 137/801 |
| 3,661,197 | 5/1972 | Peterson | 277/226 |
| 3,773,338 | 11/1973 | Fidler | 277/34 |
| 4,026,328 | 5/1977 | Nelson | 137/801 |
| 4,178,000 | 11/1979 | Kuttner | 277/226 |
| 4,309,007 | 1/1982 | Logsdon | 248/56 |
| 4,353,139 | 10/1982 | Wainwright | 4/661 |
| 4,385,777 | 5/1983 | Logsdon | 285/12 |
| 4,516,749 | 5/1985 | Sullivan | 248/56 |
| 4,550,451 | 11/1985 | Hubbard | 4/192 |

Primary Examiner—A. Michael Chambers
Attorney, Agent, or Firm—Norman S. Blodgett; Gerry A. Blodgett

[57] ABSTRACT

System for sealing a plumbing fixture, which fixture has a flange with an edge lying in spaced relationship to a vertical wall surface and a sealing element lying along and attached to the said edge to compensate for variations in the distance between the edge and the wall.

6 Claims, 2 Drawing Sheets

PLUMBING SEALING SYSTEM

This is a continuation of co-pending application Ser. No. 091,506, filed on Aug. 31, 1987, now U.S. Pat. No. 4,756,332, issued on July 12, 1988, which is a continuation of application Ser. No. 943,312, filed on Dec. 17, 1986, now U.S. Pat. No. 4,706,702, issued on Nov. 17, 1987.

BACKGROUND OF THE INVENTION

During the installation of plumbing in residential and commercial buildings, it is often necessary to extend the plumbing through a wall and to provide a fixture located outside of the wall. Such fixtures are usually of a decorative nature and are provided with a flange or bezel intended to cover the aperture in the wall. An example of such a fixture is, for instance, the bath spout. During the roughing-in phase of the plumbing installation, supply pipes are mounted behind the wall between the studding, while lateral extentions are provided to pass through openings in the wall itself. When the shower stall wall is provided and is covered with tile, openings in the wall covering and in the tile are made to surround the pipes to which the fixtures will ultimately be attached. Due to various inaccuracies that are introduced by the carpenter, the plumber, and the tile setter, it is unlikely that the pipe extending outwardly will exactly at a right angle to the wall surface. This means that, when the fixture is attached, the edge of its flange will lie at an angle to the wall and, therefore, not be waterproof. The gap thus formed will allow liquid to pass into the opening between the edge of the flange and the wall surface and to enter the aperture through the wall. Such water will, therefore, pass to the inside of the wall. Water leaking behind the wall can not only cause deterioration of the woodwork in the wall, but can also leak down into apartments or space below. Although plumbers, while installing the fixtures, attemp to use sealants and other materials to prevent this, nevertheless, it continues to occur. Attempts have been made in the past to provide the tub and shower valve constructed in such a way that they can be adjusted angularly relative to the pipe to which they are attached, but such attemps have not only been unsuccessful, but constitutes a costly way of manufacturing the valves. These and other difficulties experienced with the prior art devices have been obviated in a unique manner by the present invention.

It is, therefore, an outstanding object of the invention to provide a sealing system for tub, shower and like fixtures which prevents the entry of flowing water, condensate, and steam behind the wall to which the fixture is attached, abuts, or penetrates.

Another object of this invention is the provision of a seal for flanged fixtures, which seal is not easily detached from the fixtures, which is highly resilient, and yet will not absorb water.

A further object of the present invention is the provision of a sealing system for a fixture in which a permanent connection is made between a seal and the fixture, so that the seal will not be dislodged from the fixture during shipment, installation, and use.

It is another object of the instant invention to provide a sealing system for a flanged fixture which system is simple in construction, which is inexpensive to manufacture with readily obtainable materials, and which is capable of a long life of service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a plumbing sealing system including a fixture which has a flange adapted to lie with an edge in spaced relationship to a vertical wall surface adjacent an aperture in the wall. A sealing element is provided which lies along and is firmly attached to the said edge, while extending in the space between the edge and the wall surface. The sealing element is formed of an elastomer that is capable of extensive deformation, and yet is impervious to water.

More specifically, the said edge of the flange or escutcheon defines a closed circular path confined to a single plane circumscribing the aperture in the wall, and wherein the sealing element is in the shape of an annulus, or conforming to the shape of a valve and escutcheon.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
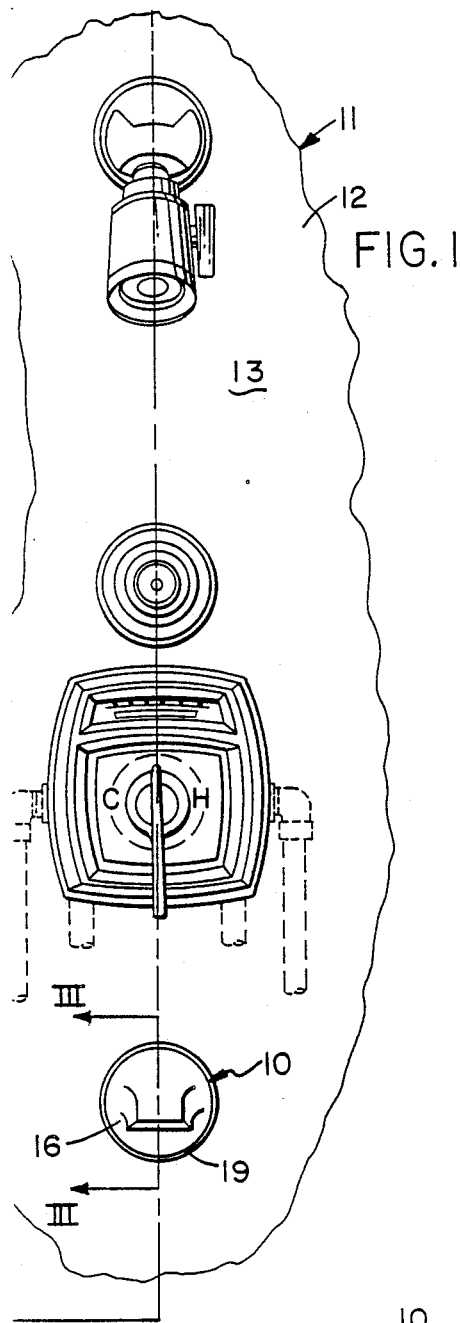
FIG. 1 is a front elevational view of a tub and shower installation incorporating a sealing system constructed in accordance with the principles of the present invention.
Figure 2:
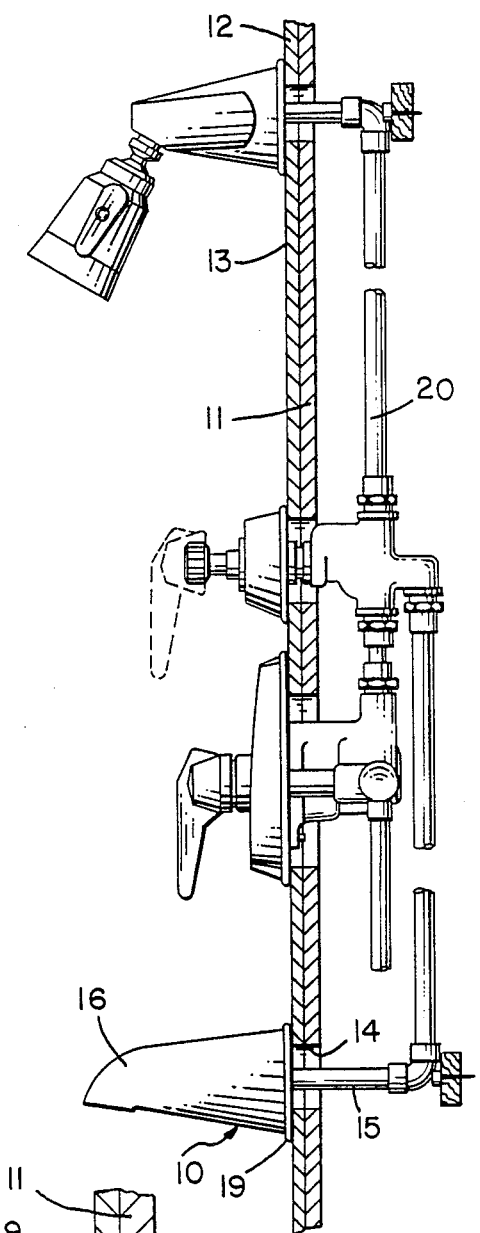
FIG. 2 is a vertical sectional view of the installation taken on the line II—II of FIG. 1.

Referring first to FIGS. 1 and 2, which best show the general features of the invention, the plumbing sealing system, indicated generally by the reference numeral 10, is shown in use on a vertical wall 11 of a tub or shower wall or stall. The wall is provided with tile or other finish surface 12 having a vertical surface 13. Extending through an aperture 14 in the wall 11 is a conduit 15 for supplying water to a fixture or spout 16 mounted on the surface 13 of the wall. The fixtures and escutcheons, such as a shower head, temperature control, and supply handles, are also mounted on the wall above the fixture 16, which is shown as a bath spout. The conduit 15 is part of a complex plumbing supply system 20 mounted behind the wall 11 in the usual way.

Figure 3:
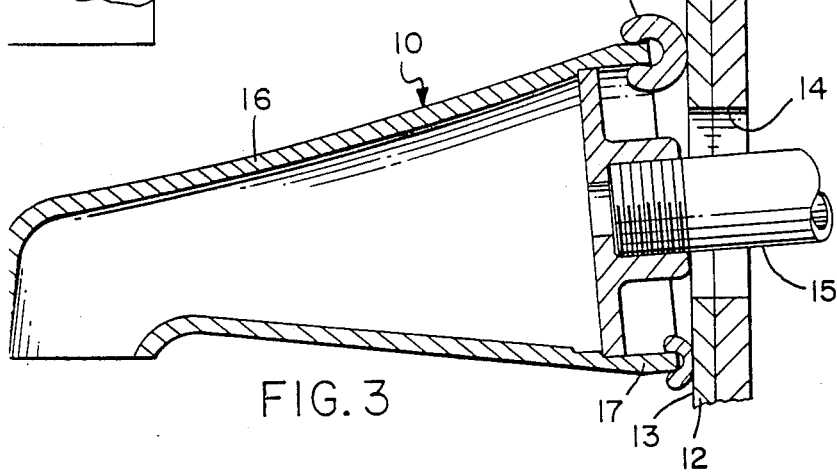
FIG. 3 is a vertical sectional view of a plumbing sealing system taken on the line III—III of FIG. 1.
Figure 4:
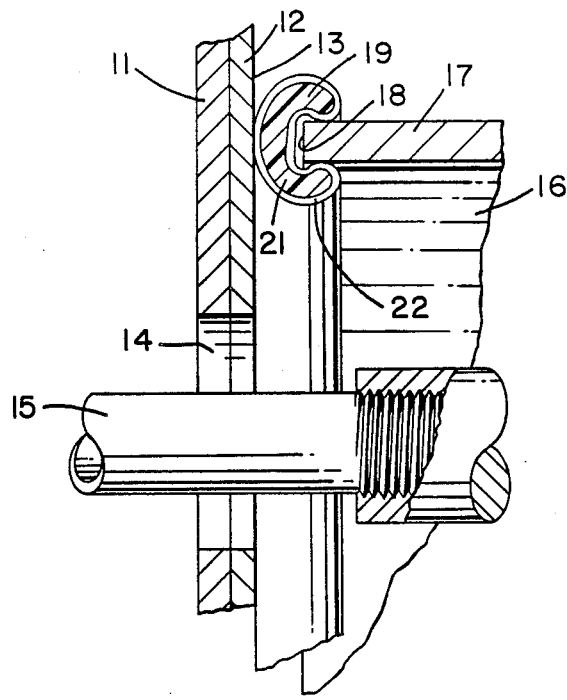
FIG. 4 is an enlarged view of a portion of the apparatus shown in FIG. 3.

FIGS. 3 and 4 show the details of the system as applied to the bath spout 16. Fixture 16 is provided with a flange 17 that is adapted to lie with an edge 18 lying in spaced relationship to the vertical wall surface 13 adjacent the aperture 14 in the wall. A sealing element 19 lies along and is firmly attached to the said edge 18. The sealing element extends in the space between the edge and the wall surface and is formed of an elastomer that is very resilient and impervious to water.

The edge 18 of the flange 17 is in the form of a closed circular path which is confined to a single plane that circumscribes the aperture 14 in the wall; the sealing element is in the shape of an annulus, or conforming to shape of the escutcheons.

As shown in FIG. 4, the sealing element 19 has a porous, very resilient, inner body 21 that is completely surrounded by a non-porous, moderately-resilient skin 24. In the preferred embodiment, the sealing element 19 is formed by the so-called "structural foam" system in which molten plastic containing a gas generating chemical is injected into a mold. The gas bubbles in the plastic are generated and form the porous inner body, while the outer surface contacts the cold surface of the mold which closes the bubbles and forms a dense, non-porous skin.

As is evident in FIG. 4, the sealing element 19 has a generally C-shaped cross section in which the arms of the "C" embrace and grasp opposite, spaced, parallel surfaces of the flange, tube, or escutcheon 17.

As is particularly evident in FIG. 3, the sealing element 19 compensates for angularity between the edge 18 of the flange, tube or escutcheon 17 and the surface 13 of the wall. In FIG. 3, an exaggerated angularity is purposely shown between the fixture 16 and the wall caused, presumably, by the fact that the conduit 15 (during the installation of the supply system 20) extends through the aperture 14, but is not exactly perpendicular to the surface 13. Because the fixture 16 has to be threaded on to the conduit 15, it must necessarily occupy the posture that is dictated by the conduit 15 which has been permanently installed in the wall. When this produces an angular relationship between the edge 18 of the flange 17 and the surface 13 of the wall, the sealing element 19 serves to compensate in the manner shown in FIG. 3. At the lower part of the fixture, the sealing element is flattened but still fills the gap between the edge and the surface completely. In the upper part, where the gap is wider, the resilient nature of the seal also fills the gap and prevents the entrance of water behind the fixture, through the aperture 14 and into the back surface of the wall where the damage would be done. The dense, impervious nature of the skin 24 prevents any water that strikes the sealing element from being absorbed.

It can be seen to be particularly true in a tub, shower stall installation that water can run down the surface 13 of the tile or surface wall towards the bath spout or face plate escutcheon 16 which is at the very bottom of the wall. Water and steam coming from the shower head and other sources, such as condensation and steam, serves to exaccerbate these possible destructive conditions. The present invention prevents the water from entering the aperture and back side of the wall and doing damage. At the same time, the fact that sealing element 19 grasps the edge 18 of the flange or escutcheon means that the seal can remain permanently with the fixture 16 and not be lost or mislaid during shipping and installation by the installer. This is particularly true if a slight amount of cement is applied to the arms of the seal before before it is applied to the flange 17 at the factory.

Figure 5:
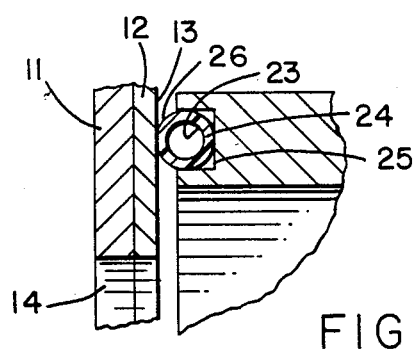
FIG. 5 is a vertical sectional view of a modified form of the invention.

In FIG. 5, it can be seen that the sealing element 26 is provided with a hollow central chamber 23 that is completely enclosed by a non-porous, moderately-resilient skin 24. The edge of the flange is provided with a groove 25 in which the sealing element 26 resides and because of its resilient and impervious nature, the sealing element prevents the access of water around the edge of the fixture and through the aperture 14 in the wall.

Figure 6:
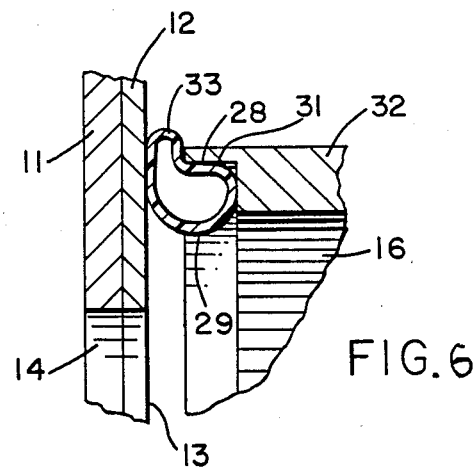
FIG. 6 is a vertical sectional view of a still further modification of the invention.

In FIG. 6, the sealing element 28 has an oval-shaped main body 29 that fits in a rabbet 31 formed on the inside corner of the flange 32. The sealing element has a ridge 33 which extends outwardly of the main body and around the outside corner of the flange. The main body 29 and the ridge 33 are hollow in the interior in the same manner as the sealing element of FIG. 5.

Figure 7:
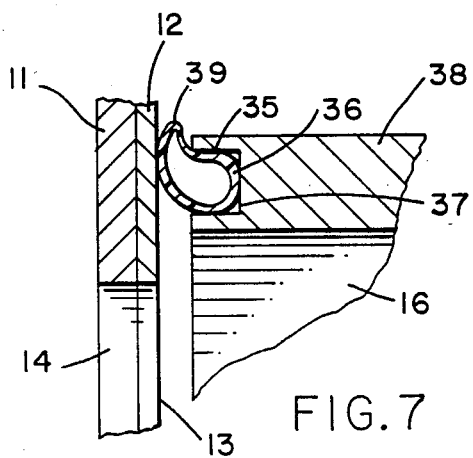
FIG. 7 is a vertical sectional view of another form of the invention.

Referring next to FIG. 7 which shows a further modification of the invention, it can be seen that the sealing element 35 has an oval-shaped main body 36 that fits snugly in a groove 37 formed in the edge of the flange 38. Sealing element also has a ridge 39 extending outwardly of the main body.

Figure 8:
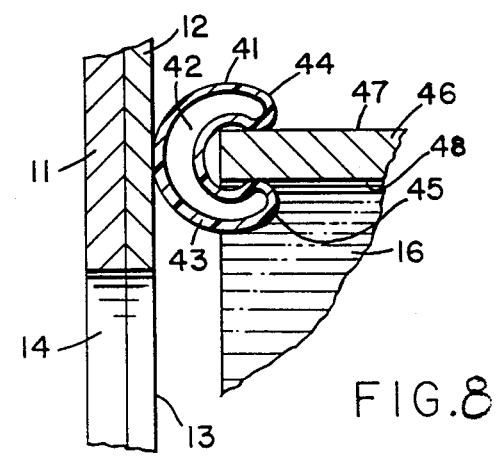
FIG. 8 is a vertical sectional view of another modification of the invention.

FIG. 8 shows a variation in the form of the invention in which the sealing element 41 has a hollow central chamber 42 that is completely enclosed by a non-porous, moderately-resilient skin 43. The sealing element has a generally C-shaped cross section and the arms 44 and 45 of the sealing element embrace and grasp opposite spaced parallel surfaces 47 and 48, respectively, of the flange 46; cement applied to the arms of the sealing element before being applied to the flange will increase the benefits of the construction.

Advantages of the present invention will now be readily understood in view of the above description. It can be seen that, by providing a sealing element which attaches firmly to the flange of the fixture, it is possible to assure that the sealing element will remain with the fixture following manufacture, shipment, rough storage and handling by the plumber, and finally during installation on the wall of the shower stall. Because the center body of the sealing element is relatively resilient, especially where the center is air instead of foam, the resilient nature is not removed by the provision of a dense outer skin which skin renders the seal impervious to water and prevents it becoming soaked with water and causing problems from the point of view. Furthermore, the outer skin is capable of being aluminized or receiving a color coating to make it aesthetically pleasing when combined with the rest of the fixture and of the tile. By compensating for the variation in spacing between the edge of the flange of the fixture and the vertical wall, the appearance of the fixture installation is vastly improved, as well as having the practical effect of preventing condensate and other forms of water from getting behind the wall and doing damage. At the same time, the seal is inexpensive to install and the sealing system itself is readily acceptable by plumbers so that its use can be extensively promoted, thus leading to better building installations with fewer returns to the site by the plumber to correct water problems.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Plumbing sealing system, comprising:

(a) a fixture including a flange adapted to lie with an edge in spaced relationship to a vertical wall surface adjacent an aperture in the wall, and (b) a sealing element in the shape of an annulus of circular cross-section lying along and firmly attached to the said edge, while extending into the space between the plane of the edge and the wall surface, the sealing element being formed of an elastomer that is resilient and impervious to water, wherein the said edge of the flange defines a closed circular path confined to a single plane circumscribing the aperture in the wall, and wherein the sealing element has a porous, very resilient inner body completely surrounded by a non-porous, moderately-resilient skin, wherein the edge of the flange has a groove with a depth at least equal to the radius of the sealing element, and wherein the sealing element fits snugly in the groove.

2. Plumbing sealing system, comprising:

(a) a fixture including a flange adapted to lie with an edge in spaced relationship to a vertical wall surface adjacent an aperture in the wall, and (b) a sealing element in the shape of an annulus of circular cross-section lying along and firmly attached to the said edge, while extending into the space between the plane of the edge and the wall surface, the sealing element being formed of an elastomer that is resilient and impervious to water, wherein the said edge of the flange defines a closed circular path confined to a single plane circumscribing the aperture in the wall, and wherein the sealing element has a hollow central chamber completely enclosed by a non-porous, moderately-resilient skin, wherein the edge of the flange has a groove with a depth at least equal to the radius of the sealing element, and wherein the sealing element fits snugly in the groove.

3. Plumbing sealing system, comprising:

(a) a water supply conduit extending through an aperture in a vertical wall, (b) a fixture mounted on the conduit and having a flange with an edge that extends entirely around the aperture and is generally concentric with the conduit, the edge lying in spaced relationship with the surface of the wall, the flange being defined by inner and outer cylindrical surfaces that are concentric and spaced form one another, (c) a sealing element in the shape of an annulus of circular cross section lying along and attached to the edge of the flange, the sealing element being generally resilient and impervious to water, and (d) means including cooperating surfaces of the edge of the flange and the seal to maintain the position of the seal relative to the edge and to prevent a change of the said position, wherein the edge of the flange has a groove with a depth at least equal to the radius of the sealing element, and wherein the sealing element fits snugly in the groove.

4. Plumbing sealing system, comprising:

(a) a fixture including a flange adapted to lie with an edge in spaced relationship to a vertical wall surface adjacent an aperture in the wall, and (b) a sealing element in the shape of an annulus of circular cross-section lying along and firmly attached to the said edge, while extending into the space between the plane of the edge and the wall surface, the sealing element being formed of an elastomer that is resilient and impervious to water, wherein the said edge of the flange defines a closed circular path confined to a single plane circumscribing the aperture in the wall, and wherein the sealing element has a porous, very resilient inner body completely surrounded by a non-porous, moderately-resilient skin, wherein the edge of the flange has a rabbet, with a depth of at least equal to the radius of the sealing element, and wherein the sealing element fits snugly in the rabbet.

5. Plumbing sealing system, comprising:

(a) a fixture including a flange adapted to lie with an edge in spaced relationship to a vertical wall surface adjacent an aperture in the wall, and (b) a sealing element in the shape of an annulus of circular cross-section lying along and firmly attached to the said edge, while extending into the space between the plane of the edge and the wall surface, the sealing element being formed of an elastomer that is resilient and impervious to water, wherein the said edge of the flange defines a closed circular path confined to a single plane circumscribing the aperture in the wall, and wherein the sealing element has a hollow central chamber completely enclosed by a non-porous, moderately-resilient skin, wherein the edge of the flange has a rabbet with a depth of at least equal to the radius of the sealing element, and wherein the sealing element fits snugly in the rabbet.

6. Plumbing sealing system, comprising:

(a) a water supply conduit extending through an aperture in a vertical wall.

(b) a fixture mounted on the conduit and having a flange with an edge that extends entirely around the aperture and is generally concentric with the conduit, the edge lying in spaced relationship with the surface of the wall, the flange being defined by inner and outer cylindrical surfaces that are concentric and spaced form one another, (c) a sealing element in the shape of an annulus of circular cross section lying along and attached to the edge of the flange, the sealing element being generally resilient and impervious to water, and (d) means including cooperating surfaces of the edge of the flange and the seal to maintain the position of the seal relative to the edge and to prevent a change of the said position, wherein the edge of the flange has a rabbet with a depth at least equal to the radius of the sealing element, and wherein the sealing element fits snugly in the rabbet.

* * * * *